United States Patent
Lahser

(10) Patent No.: US 11,602,667 B2
(45) Date of Patent: *Mar. 14, 2023

(54) METHOD AND APPARATUS FOR PREDICTING THE LIKELY SUCCESS OF GOLF SWINGS

(71) Applicant: Singleshot Entertainment Inc., Las Vegas, NV (US)

(72) Inventor: Jason Lahser, St. Ives (AU)

(73) Assignee: Singleshot Entertainment Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,533

(22) Filed: Oct. 6, 2022

(65) Prior Publication Data

US 2023/0029015 A1    Jan. 26, 2023

Related U.S. Application Data

(63) Continuation of application No. 16/587,829, filed on Sep. 30, 2019, now Pat. No. 11,491,370, which is a continuation of application No. 15/325,934, filed as application No. PCT/AU2015/000411 on Jul. 15, 2015, now Pat. No. 10,427,001.

(30) Foreign Application Priority Data

Jul. 16, 2014  (AU) ................................ 2014902742

(51) Int. Cl.
| | |
|---|---|
| *A63B 24/00* | (2006.01) |
| *A63F 13/812* | (2014.01) |
| *A63B 60/46* | (2015.01) |
| *G07F 17/32* | (2006.01) |
| *A63B 102/32* | (2015.01) |

(52) U.S. Cl.
CPC .......... *A63B 24/0006* (2013.01); *A63B 60/46* (2015.10); *A63F 13/812* (2014.09); *G07F 17/3288* (2013.01); *A63B 2024/0009* (2013.01); *A63B 2102/32* (2015.10); *A63B 2220/12* (2013.01); *A63B 2220/76* (2013.01)

(58) Field of Classification Search
CPC combination set(s) only.
See application file for complete search history.

(56) References Cited

U.S. PATENT DOCUMENTS

| | | |
|---|---|---|
| 6,506,124 B1 | 1/2003 | Manwaring et al. |
| 6,802,772 B1 | 10/2004 | Kunzle et al. |
| 8,409,024 B2 * | 4/2013 | Marty ................ A63B 24/0003 356/28 |
| 8,540,583 B2 | 9/2013 | Leech |
| 9,623,284 B2 * | 4/2017 | Lafortune .......... A63B 69/3605 |
| 2007/0049393 A1 | 3/2007 | Gobush |
| 2007/0072679 A1 * | 3/2007 | Kerns ..................... A63F 13/12 463/42 |
| 2012/0109577 A1 | 5/2012 | Nyhart et al. |

FOREIGN PATENT DOCUMENTS

| | | |
|---|---|---|
| GB | 2411127 A | 8/2005 |
| WO | 2009074189 A1 | 6/2009 |

* cited by examiner

*Primary Examiner* — Omkar A Deodhar
(74) *Attorney, Agent, or Firm* — Connie R. Masters

(57) ABSTRACT

A method of predicting the likelihood of a post T-off golf swing or consecutive swings resulting in a ball being sunk in a hole; the method utilizing communication equipped cameras or communication equipped laser rangefinders at known locations to determine accurate ball lie information. Transmission of this location information in real time to a processing facility linked to a database of historical play information incorporating at least ball position information and golf course in order to calculate odds of success of the upcoming swing and/or subsequent swings.

25 Claims, No Drawings

METHOD AND APPARATUS FOR PREDICTING THE LIKELY SUCCESS OF GOLF SWINGS

CROSS-REFERENCE TO RELATED APPLICATIONS

This application is a continuation of co-pending U.S. patent application Ser. No. 16/587,829 filed on Sep. 30, 2019 that is a continuation of U.S. patent application Ser. No. 15/325,934 with a 35 U.S.C. § 371 (c) date of Jan. 12, 2017 (now U.S. Pat. No. 10,427,001) that is a 35 U.S.C. § 371 national stage entry of PCT/AU2015/000411 filed on Jul. 15, 2015, which claims priority to Australia Patent Application No. 2014902742 filed on Jul. 16, 2014, all of which are incorporated herein in their entirety.

FIELD OF INVENTION

This invention relates to a method and apparatus for predicting the likely success of golf swings.

BACKGROUND OF THE INVENTION

Statistical information has long been compiled in the game of golf referable to the likelihood of completing a game or hole with a certain number of swings. However, with these statistics the ball position at the start of the hole or game is well defined always the same. The game of golf presents unique challenges to anyone trying to quickly in real time predict the odds of success of a particular golf swing or swings due to the game been played over a large geographical area with ball position difficult to plot. Any plotting mechanism must also face conservative organizers, players, golf course owners and viewers resistant to any change in playing conditions. Swing success information can gainfully be used by various persons such as sports commentators or gambling market.

OBJECT OF THE INVENTION

Accordingly, it is an object of the present invention to provide method and apparatus which involve minimal change to tournament environment and playing conditions and which assist in calculating the odds of a golf swing or swings in a golf game terminating in a hole.

SHORT SUMMARY OF THE INVENTION

According to the present invention there is disclosed a method of predicting the likelihood of a golf swing or consecutive swings sinking a ball in a hole comprised of the steps of:
  a) selecting a post tee off swing or post tee off consecutive swings in a golf game;
  b) setting up a communication enabled data processing facility linked to a database of historical play information including at least ball position and golf course to calculate odds of success of the upcoming swing and/or subsequent swings;
  c) placing electronic communication enabled ball position identifying equipment at a functional distance and location relative to the ball involved in the subject swing or swings;
  d) activating the electronic communication enabled ball position identifying equipment so as to precisely determine ball position and broadcasting this information to a processing facility in real time; and
  e) comparing the real time ball position information received at the processing station with the database of prior ball positions in order to calculate the odds of the upcoming swing or swings terminating in a hole.

PREFERRED MODE OF CARRYING OUT THE INVENTION

Two embodiments of the present invention will now be described with reference to gambling market makers, but it should be appreciated that the real time ball location information may equally well be used by sportscasters and other parties.

Punters have long been interested in betting on the outcome of games and sports and this has grown into an enormous industry worldwide. Punters however need to be kept interested and hence it is desirable that they be able to place bets at frequent time intervals. The current invention facilitates betting on the final two shots of each hole (although is not limited to this purpose). Of course, until a ball is sunk no one can be sure whether a swing or swings are the last ones but when a swing is occurring within about 250 meters of a hole and preferably within 200 meters then the chances of there being only 2 shots left before the ball is sunk in that hole ranges from highly unlikely to highly likely but centers around even odds. This distribution of odds is desirable for market makers and punters alike. The two following swings once a ball is within 250 meters of the hole or preferably 200 meters on some courses will hereafter be called an "Up and Down" bet on the basis that the first swing is intended to get the ball "up" onto the green and the second swing (usually a putt) terminates with the ball "down" the target hole. A punter may bet on failure to sink the ball within these two swings or success.

The present invention helps facilitate a market in individual shots or combinations of shots by assisting the market maker to calculate fairly precise odds. In order to reliably calculate odds a number of input criteria or factors can be used with one of the most important being ball position on the course just before the shot/swing. Other input criteria or factors can then be linked to ball position such as historical data of shots from that position by the particular player involved as well as other similar standard players. Weather, wind, stimp value and other factors may also be included in an algorithm to help determine statistical odds.

Golf game organizers, players, spectators, and course/club officials are very conservative however so any method of determining ball location cannot be intrusive, effect spectator movement, ball characteristics or player concentration.

Having pre-positioned laser rangefinder equipped personnel at known non-intrusive locations on or adjacent the course or use of a camera carrying GPS enabled remote control, airborne electric drone in accordance with the present invention could determine exact ball location with minimal impact on the game.

In use the deployment of a drone in accordance with the present invention would be as follows:
  1. The drone operator via transmissions from the drone's camera is watching a game from a distance.
  2. A player hits a ball, and the ball lands somewhere.
  3. The drone flies above the stationary ball and with the aid of an onboard downward facing camera, hovers directly over the ball, thus determining the exact location of the ball via GPS.

4. Drone guidance software linked to the camera guides the drone to a position directly above the ball.
5. The drone then relays the drone's exact GPS location to a communication enabled data processing facility linked to a database of historical play information incorporating at least ball position information and golf course to calculate odds of success of the upcoming swing and/or subsequent swings.
6. The drone flies away and player takes next shot.

Ideally the drone should be capable of transmitting real time photographs or video so that it may quickly be positioned directly above a ball on the course. Once in such position GPS apparatus on board the drone would transmit ball position information to a remote location in order that the odds of success of a shot from that position may be quickly calculated.

Battery powered drones can be made relatively quiet and can proceed to the landing position of a ball well before the player and spectators are ready to play/observe the swing. This not only avoids any interference with the game due to the noise of the drone (as it will have done its job and moved away well before the shot is played) but also it gives time for punters to place bets without undue delay in the game play.

The drone will have automatic self-righting capability using onboard circuitry/microcontroller as is currently available as well as propeller shielding for safety. The frequencies of the remote control, GPS data transmission and video stream would preferably be well separated so as to preclude any interference with each other using industry standard equipment.

Control and communication circuits for the drone will use commercially available and tested equipment to ensure consistency and quality while maintaining safety. The drone may use WAN (wide area network) and possibly Infra-red (IR) direct sight line communication, depending on data transfer speeds and weight restrictions.

Multiple drones may advantageously be utilized during a tournament to facilitate battery changeovers necessary due to relatively short fly time capabilities of light battery-operated drones.

According to another aspect of the current invention ball position may be determined by directing one or more laser range finders having a known position at the stationary ball.

The laser rangefinder/s or rangefinder operators then relay the distance between them and the ball to location to a communication enabled data processing facility for processing as in the drone related example.

If the laser rangefinders or rangefinder operators are provided with an accurate compass, then one such laser is adequate to determine ball position. If the lasers are not provided with sufficiently accurate compasses, then two or preferably three lasers at known positions are required to get ball location. Data sent from rangefinders or rangefinder operating personnel may be transmitted using a WAN network.

Ideally if the laser rangefinders are portable then the operators would also employ optical scopes for targeting as well as tripods. Although infra-red spectrum light may be used by the laser rangefinders other wavelengths in the non-visible spectrum may be employed if a visible red dot on the ball is considered intrusive.

It is presently contemplated that betting would best be introduced on the success of swings within 200 meters of the hole. The bet would ideally be based on the odds of a ball being sunk by two strokes as an "up and down". An "up and down" occurs when the first swing gets the ball "up" into the air and lands it on the green and then the second shot along the green putts the ball. A market could also be made on a swing when the ball is already on the green by betting on the putt being "in" the hole in one swing. Punters could consequently bet on the same shots as initially as an "up and down" and then, once on the green, as an "in" before the final outcome of the first "up and down" swings were known. Arbitrage bets could therefore be taken. Bets on "lag putts" involving two shots could also be taken.

For the majority of recreational punters, betting is often driven by emotion for entertainments sake and the relatively short time to place bets in between shots would be desirable in order to maximize turnover for the market maker. Punters would have time to place their bets whilst still having a sense of urgency, excitement, and continuing interest in the ongoing game. The level of ball location information the present invention provides will give the punter enough details to feel motivated and involved.

The above description demonstrates that the current invention provides a new and novel fast moving way of attracting punters to the game of golf and forming an exchange market. Note that the type of information gathered in accordance with the present invention could potentially be licensed with the intention of been used in other statistical fields such as information gathering for non-gambling entities such as sportscasters.

It should also be appreciated that alternate embodiments of the present invention may be devised apart from that above described without departing from the scope and intendment of the invention.

What is claimed is:

1. A system for predicting statistical swing success comprising:
    ball position identifying equipment that is placed at a location remote from said pre-swing ball position, that is placed at a functional distance from a pre-swing ball position, and that is electronic communication enabled; wherein said ball position identifying equipment identifies said pre-swing ball position; and wherein said ball position identifying equipment transmits said pre-swing ball position in real time prior to a post tee off golf swing from said pre-swing ball position; and
    a data processing facility that is electronic communication enabled and that is linked to a database of historical play information; wherein said historical play information comprises at least ball positions on a golf course correlated with historical data of shot success; wherein said data processing facility receives said pre-swing ball position from said ball position identifying equipment; wherein said data processing facility calculates, prior to said post tee off golf swing, odds of success of said post tee off golf swing or of said post tee off golf swing and one or more consecutive swings by comparing said pre-swing ball position with said historical play information of said database.

2. The system for predicting statistical swing success as recited in claim 1, wherein said historical play information further comprises at least one of historical data of shots from said pre-swing ball position for a particular player or historical data of shots from said pre-swing ball position for standard players similar to a particular player.

3. The system for predicting statistical swing success as recited in claim 1, wherein said data processing facility further calculates said odds of success of said post tee off golf swing or of said post tee off golf swing and one or more consecutive swings using wind data.

4. The system for predicting statistical swing success as recited in claim 1, wherein said data processing facility further calculates said odds of success of said post tee off golf swing or of said post tee off golf swing and one or more consecutive swings using weather data.

5. The system for predicting statistical swing success as recited in claim 1, wherein said ball position identifying equipment comprises multiple laser rangefinders at precisely known locations.

6. The system for predicting statistical swing success as recited in claim 1, wherein said ball position identifying equipment comprises one or more cameras at precisely known locations.

7. The system for predicting statistical swing success as recited in claim 1, wherein said ball position identifying equipment is mounted on a readily maneuverable aerial drone.

8. The system for predicting statistical swing success as recited in claim 1, further comprising a betting market offering a bet based on said odds of success of said post tee off golf swing or of said post tee off golf swing and one or more consecutive swings.

9. The system for predicting statistical swing success as recited in claim 1, wherein said odds of success of said post tee off golf swing or of said post tee off golf swing and one or more consecutive swings are provided to a sportscaster.

10. A system for producing statistical golf odds comprising:
a data processing facility comprising communication electronics and linked to a database of historical play information including at least prior ball positions and golf course; wherein said data processing facility that predicts statistical swing success in real time by comparing a pre-swing ball position of a golf ball before a post tee off shot with said prior ball positions of said database; and
ball position identifying equipment that is electronic communication enabled, that is placed at a functional distance from a pre-swing ball position, and that is placed at a location remote from said pre-swing ball position; wherein said ball position identifying equipment identifies said pre-swing ball position; and wherein said ball position identifying equipment transmits said pre-swing ball position in real time to said data processing facility prior to a post tee off golf swing from said pre-swing ball position.

11. The system for producing statistical golf odds as recited in claim 10, wherein said historical play information further comprises at least one of historical data of shots from said pre-swing ball position for a particular player or historical data of shots from said pre-swing ball position for standard players similar to a particular player.

12. The system for producing statistical golf odds as recited in claim 10, wherein said data processing facility further predicts statistical swing success of said post tee off golf swing or of said post tee off golf swing and one or more consecutive swings using wind data.

13. The system for producing statistical golf odds as recited in claim 10, wherein said data processing facility further predicts statistical swing success of said post tee off golf swing or of said post tee off golf swing and one or more consecutive swings using weather data.

14. The system for producing statistical golf odds as recited in claim 10, wherein said ball position identifying equipment comprises multiple laser rangefinders at precisely known locations.

15. The system for producing statistical golf odds as recited in claim 10, wherein said ball position identifying equipment comprises one or more cameras at precisely known locations.

16. The system for producing statistical golf odds as recited in claim 10, wherein said ball position identifying equipment is mounted on a readily maneuverable aerial drone.

17. The system for producing statistical golf odds as recited in claim 10, further comprising a betting market offering a bet based on odds of success of said post tee off golf swing or of said post tee off golf swing and one or more consecutive swings.

18. The system for producing statistical golf odds as recited in claim 10, wherein said odds of success of said post tee off golf swing or of said post tee off golf swing and one or more consecutive swings are provided to a sportscaster.

19. A system for using statistical golf odds comprising:
a data processing facility comprising communication electronics and linked to a database of historical play information including at least prior ball positions and golf course; wherein said data processing facility predicts, in real time, a likelihood of a post tee off golf swing or consecutive swings sinking a ball in a hole by comparing a pre-swing ball position of a golf ball before a post tee off shot with said prior ball positions of said database; wherein said pre-swing ball position is transmitted in real time to said data processing facility, prior to said post tee off golf swing, from electronic communication-enabled ball position identifying equipment; wherein said electronic communication-enabled ball position identifying equipment is placed at a functional distance from, and remote from, said pre-swing ball position; wherein said electronic communication-enabled ball position identifying equipment identifies said pre-swing ball position in real time prior to said post tee off golf swing; and
a gambling market offering a bet based on odds of success of said post tee off golf swing or of said post tee off golf swing and one or more consecutive swings.

20. The system for using statistical golf odds as recited in claim 19, wherein said historical play information further comprises at least one of historical data of shots from said pre-swing ball position for a particular player or historical data of shots from said pre-swing ball position for standard players similar to a particular player.

21. The system for using statistical golf odds as recited in claim 19, wherein said data processing facility further predicts statistical swing success of said post tee off golf swing or of said post tee off golf swing and one or more consecutive swings using wind data.

22. The system for using statistical golf odds as recited in claim 19, wherein said data processing facility further predicts statistical swing success of said post tee off golf swing or of said post tee off golf swing and one or more consecutive swings using weather data.

23. The system for using statistical golf odds as recited in claim 19, wherein said ball position identifying equipment comprises multiple laser rangefinders at precisely known locations.

24. The system for using statistical golf odds as recited in claim 19, wherein said ball position identifying equipment comprises one or more cameras at precisely known locations.

25. The system for using statistical golf odds as recited in claim 19, wherein said ball position identifying equipment is mounted on a readily maneuverable aerial drone.

\* \* \* \* \*